United States Patent Office 2,834,717
Patented May 13, 1958

2,834,717

PROCESS OF DESULFURIZING HYDROCARBONS WITH A BORON FLUORIDE COORDINATION COMPOUND FOLLOWED BY HYDROFINING WITH A HYDROGEN DONOR

Chyn duog Shiah, Manhasset, N. Y.

No Drawing. Application March 7, 1956
Serial No. 569,971

8 Claims. (Cl. 196—28)

This invention relates to the treatment of hydrocarbon oils and is more particularly concerned with the treatment of heavy residual oils to remove undesired components and contaminants and in general to improve its quality and value.

The "bottom of the barrel" stocks, particularly those from high sulfur crude oils, have always been a bane to the petroleum industry. For many years, residual products from petroleum have commanded prices appreciably below those for most other petroleum products, in fact, lower than the crude oil itself. There is no indication that the situation will change much in the foreseeable future either. To alleviate this situation, there are two different approaches.

(1) To convert chemically the poorer quality residual oil into more valuable products.

(2) Improve the quality, by either chemical or physical means, of the residual oil, and, therefore, its range of applicability by a. Removing or reducing the amount of undesirable constituents such as asphaltenes, carbon, ashes, mineral matters such as vanadium, nickel, iron and sodium compounds, sulfur, oxygen and nitrogen compounds, etc.

b. Using additives to counteract or lessen the harmful effects of these undesirable constituents.

A tremendous amount of research work has been carried out along these lines and many proposals have been made. It is the purpose of this invention to propose a new two stage process which is generally applicable to the solution of the problem with advantages apparent to those who are skilled in this art.

In my co-pending application, Serial No. 260,313, filed December 6, 1951, now U. S. Patent No. 2,745,792, I have disclosed a pseudo-chemical method for purifying hydrocarbon oils. Thus by treating a heavy residual oil with a very small amount of a coordination compound of boron fluoride, I have been able to effect remarkable overall improvement of the quality of the oil. Substantial proportions of undesirable constituents such as asphalt, carbon, sulfur, nitrogen, oxygen compounds and ashes can be removed. In addition to these undesirable constituents, the treatment is most effective in removing metallic constituents such as iron, vanadium, nickel, lead and sodium compounds, etc.

It is an object of this invention to provide an improved process for the removal from heavy hydrocarbon oil stocks of deleterious and/or undesirable constituents such as various metallic constituents, viz. iron, vanadium, nickel, lead and sodium compounds, and the like.

A further object of this invention is to provide a process for improving the quality of heavy hydrocarbon stocks by the removal of sulfur compounds especially those of cyclic nature and/or of high molecular weight.

An additional object of this invention is to provide a process for removing nitrogen and/or oxygen compounds from heavy hydrocarbon oil stocks.

In accordance with the present invention there is provided a process for removing from heavy residual oils undesirable and/or harmful constituents such as metallic constituents, sulfur compounds, nitrogen compounds, oxygen compounds, and the like, which comprises first treating the oils with a boron fluoride coordination compound to effect reaction between the boron fluoride coordination compound and the undesired constituents of the hydrocarbon oil being treated. The boron fluoride coordination compound and the associated constituents of the oil stratify as a coalesced phase and the refined hydrocarbon oil with a trace of $BF_3$ coordination compound forms a purified phase. The coalesced phase is readily separated by decantation, centrifuging or other convenient means from the purified phase. The boron fluoride coordination compound is recovered from the coalesced phase. The purified phase with or without the removal of traces of $BF_3$ coordination compound, is then subjected to catalytic hydrogenation, using a hydro-aromatic compound as the sole hydrogen source, the hydrogenation step being carried out at relatively low pressures and temperatures. The gaseous hydrogenation products obtained from the undesired constituents are removed from the hydrogenation zone as a gaseous effluent. The refined oil is recovered from the hydrogenation step by removing from the mixture unreacted hydro-aromatic compounds and aromatic compounds derived from the hydrogen donor during the reaction.

It is a feature of my invention that the specified two-stage treatment results in the selective removal, when present in the hydrocarbon oil treated, of metallic constituents, sulfur compounds, particularly cyclic sulfur compounds and high molecular weight sulfur compounds, nitrogen compounds, oxygen compounds, and other undesired constituents in a highly-effective, economical manner, and concurrently in the further improvement of the quality and value of the oil by effecting a hydrogenation reaction under conditions not heretofore considered practicable.

Other objects and features of my invention will be readily apparent to those skilled in the art from the following detailed description of my hydrocarbon oil treating process.

The boron fluoride coordination compound is used in an amount corresponding to at least 0.1% by volume, preferably 0.5 to 25% by volume of the oil treated, and is intimately mixed with the hydrocarbon oil for a short period of time, e. g. one-half minute to thirty minutes, and the oil is then separated from the boron fluoride reaction products. The coalesced stratum is readily separated, by decantation, centrifuging or other convenient means, from the purified stratum and the boron fluoride coordination compound is easily separated from the coalesced phase by methods outlined below.

I employ coordination compounds of boron fluoride with alcohols, ethers, ketones, esters, acid anhydrides, aldehydes and nitrogen compounds such as ammonia, amines, amides, amino alcohols and anilides. Examples of suitable boron fluoride coordination compounds with alcohols are:

Methyl alcohol boron fluoride ($BF_3.CH_3OH$)
Ethyl alcohol boron fluoride ($BF_3.CH_3CH_2OH$)
Propyl alcohol boron fluoride ($BF_3.CH_3CH_2CH_2OH$)
Butyl alcohol boron fluoride ($BF_3.CH_3(CH_2)_2CH_2OH$)
Phenol boron fluoride ($BF_3.C_6H_5OH$)
Cresol boron fluoride ($BF_3.CH_3C_6H_4OH$)

Examples of suitable boron fluoride cordination compounds with ethers are:

Dimethylether boron fluoride ($BF_3.(CH_3)_2O$)
Diethylether boron fluoride ($BF_3.C_2H_5OC_2H_5$)
Methylethylether boron fluoride ($BF_3.CH_3OC_2H_5$)
Methylpropylether boron fluoride $$(BF_3.CH_3OCH_2CH_2CH_3)$$

Ethyl isopropylether boron fluoride $$(BF_3.C_2H_5OCH(CH_3)_2)$$

Examples of boron fluoride coordination compounds with ketones suitable for use in accordance with my invention are:

Acetone boron fluoride $(BF_3.CH_3COCH_3)$
Methylethylketone boron fluoride $(BF_3.CH_3COC_2H_5)$
Diethylketone boron fluoride $(BF_3.C_2H_5COC_2H_5)$ Examples of suitable boron fluoride coordination compounds with esters are:

Methyl formate boron fluoride $(BF_3.HCOOCH_3)$
Ethyl formate boron fluoride $(BF_3.HCOOC_2H_5)$
Ethyl acetate boron fluoride $(BF_3.CH_3COOC_2H_5)$
Ethyl propionate boron fluoride $(BF_3.CH_3CH_2COOC_2H_5)$
Methyl benzoate boron fluoride $(BF_3.C_6H_5COOCH_3)$ Examples of suitable boron fluoride coordination compounds with acid anhydrides are:

Propionic anhydride boron fluoride $$(BF_3.(CH_3CH_2CO)_2O)$$

Butyric anhydride boron fluoride $$(BF_3.(CH_3CH_2CH_2CO)_2O)$$

Isobutyric anhydride boron fluoride $$(BF_3.(CH_3)_2CHCO)_2O)$$

Examples of suitable boron fluoride coordination compounds with aldehydes are:

Acetaldehyde boron fluoride $(BF_3.CH_3CHO)$
Chloral boron fluoride $(BF_3.CCl_3CHO)$
Phenyl acetaldehyde boron fluoride $(BF_3.C_6H_5CH_2CHO)$ Examples of suitable boron fluoride coordination compounds with acids are:

Formic acid boron fluoride $(BF_3.HCOOH)$
Acetic acid boron fluoride $(BF_3.CH_3COOH)$
Propionic acid boron fluoride $(BF_3.CH_3CH_2COOH)$
Salicylic acid boron fluoride $(BF_3.HOC_6H_4COOH)$
Benzoic acid boron fluoride $(BF_3.C_6H_5COOH)$ Examples of suitable boron fluoride coordination compounds with nitrogen compounds, e. g. ammonia, amines, amides, anilides, and amino alcohols, are:

Ammonia boron fluoride $(BF_3.NH_3)$
Methylamine boron fluoride $(BF_3.CH_3NH_2)$
Aniline boron fluoride $(BF_3.C_6H_5NH_2)$
Ethanolamine boron fluoride $(BF_3.NH_2CH_2CH_2OH)$
Acetanilide boron fluoride $(BF_3.CH_3CONHC_6H_5)$
Propionamide boron fluoride $(BF_3.CH_3CH_2CONH_2)$
Urea boron fluoride $(BF_3.CO(NH_2)_2)$
Dimethyl formamide boron fluoride $$(BF_3.HCOON(CH_3)_2)$$

The boron fluoride coordination compounds which I employ should be either liquid or solid at normal room temperatures, i. e. 20° C. If the coordination compound is a liquid, it should have a specific gravity greater than 1, and should preferably vaporize below 140° C. at 760 mm. pressure. Solid coordination compounds are suitable if they are non-hygroscopic and relatively stable.

While any boron fluoride coordination compounds falling within the foregoing definitions are suitable for use in accordance with my invention, I preferably employ, and have found particularly effective, boron fluoride coordination compounds with ethers, boron fluoride coordination compounds with alcohols, and boron fluoride coordination compounds with nitrogen compounds, more particularly diethylether boron fluoride, phenol boron fluoride, and acetanilide boron fluoride.

In accordance with the invention, as soon as the metallic constituents, sulfur, nitrogen and oxygen-containing compounds have had an opportunity to react with $BF_3$, either as a molecule or as a part of the coordination compound added to the oil, a new series of coordination compounds is formed and separates out from the purified oil, either in solid form or semi-solid form in admixture with or in solution in the added agent. The reaction is almost instantaneous when intimate contact is provided. It will be understood that I consider within the scope of my invention the use of any boron fluoride coordination compound and that I do not limit myself to the specific compounds listed above, which are intended merely as illustrative. Furthermore, it is not necessary to use only one of the coordination compounds but mixtures of two or more may also suitably be used, although there is generally no particular need for using mixtures. It will be understood that the quantity of boron fluoride coordination compound used will vary from oil to oil depending upon the nature of the materials to be removed.

The temperature at which I carry out the boron fluoride-coordination compound treatment is in most instances, room temperature or slightly below, e. g. 15° C. However, when relatively viscous oils are treated it is desirable to heat them to a readily flowable state, e. g. by heating them up to about 60° C. In general, therefore, this treatment is carried out at temperatures of about 15° C. to 60° C. Alternatively or concurrently, I may dilute the viscous oil with an inert solvent such as a paraffinic or hydro-aromatic hydrocarbon or hydrocarbon fraction, e. g. n-heptane and cyclohexane. Preferably a hydro-aromatic hydrocarbon is employed and as is allowed to remain in the oil to serve as the hydrogen donor in the next step of the process.

The contact between the boron fluoride coordination compound and the oil needs only to be sufficient to permit the coordination compound to react to effect separation of the undesired constituents from the oil. Generally speaking, the contact time is between one-half minute and thirty minutes, as previously mentioned, although longer contact times may be utilized without departing from the scope of the invention.

As above described, the product resulting from treatment of a hydrocarbon oil in accordance with my process will stratify or can be readily separated into two distinct phases. As may be seen from the following table,

|  | Sp. gr. | B. P., ° C. |
|---|---|---|
| $BF_3(C_2H_5)_2O$ | 1.125 | 125.7 |
| $BF_3(CH_3)_2O$ | 1.239 | 126.6 |
| $BF_3.HCOOCH_3$ | 1.45 | 92.5 |
| $BF_3.HCOOC_2H_5$ | 1.346 | 102 (748 mm.) | the commonly available boron fluoride coordination compounds have a relatively high specific gravity compared with the usual hydrocarbon stocks. Their boiling points are also within a relatively low range so that their recovery from the extract for reuse is a relatively simple matter.

As previously mentioned, the coalesced phase containing the impurities may be separated from the purified phase by any convenient means, e. g. decantation, centrifuging and the like. Known methods of liquid-liquid extraction either batch-operated or continuous, such as the well-known Podbielniak centrifugal contactor, may be used for the contacting and separation.

All boron fluoride coordination compounds decompose somewhat upon heating even before reaching their boiling point but the decomposition products tend to recombine readily when the temperature is lowered. This property makes it possible to effect efficient recovery of the liquid agents which I employ by simple distillation. However, I prefer to use vacuum distillation, or more conveniently, partial pressure distillation, with the addition of an inert light solvent such as cyclohexane or a fraction of paraffinic or naphthenic hydrocarbon distillate boiling in the range of 60–100° C. to the coalesced phase, and then subjecting the mixture to distillation. The recovered agent, such as $BF_3(C_2H_5)_2O$, will distill over together with the light solvent. The distillate immediately separates into two layers. The lower layer being the recovered reagent. The recovery, in the laboratory has been found to be better than 99%, mechanical transfer losses notwithstanding.

Solid boron fluoride coordination compounds which are not readily separated by distillation, e. g. $BF_3$-acetanilide, are advantageously separated by means of an oxygenated solvent, e. g. a ketone, an alcohol or an ether, such as acetone, ethyl alcohol and diethyl ether, which preferentially dissolves the coordination compound. The dissolved boron fluoride coordination compound is suitably recovered by recrystallization by the addition to the solution of a second solvent which is a non-solvent for the coordination compound in known manner, or by evaporation of the solvent. Alternatively, but less desirably, the petroleum residual material may be leached from the coalesced phase by means of a petroleum hydrocarbon solvent, e. g. petroleum ether, or benzene, leaving the boron fluoride coordination behind.

To remove the traces of $BF_3$ compounds from the treated hydrocarbon stock, a step which in most instances is not necessary, I prefer to percolate the oil through a layer of cryolite or sodium fluoride with or without the admixture of percolation clay. The last trace of $BF_3$ forms sodium fluoborate which can be easily leached out from the bed by water and recovered. Alternatively, distillation and/or partial pressure distillation can be used and $BF_3$ compounds recovered.

The treatment with the boron fluoride coordination compound is advantageously carried out in a corrosion resistant vessel of any convenient type provided with proper contacting devices and, advantageously, corrosion resistant apparatus is employed in the recovery of the coordination compound from the purified and coalesced phases. However, the reagent is basically non-corrosive if moisture is excluded from the system.

For the catalytic hydrogenation step to which the thus-treated hydrocarbon stock is then subjected, in accordance with this invention, I employ a catalyst or catalysts of the hydrogenation-dehydrogenation-cracking variety such as molybdenum, tungsten, vanadium, chromium, cobalt, nickel, iron and tin and their oxides and sulfides. Mixtures of these materials or compounds or two or more of these oxides and sulfides are advantageously employed.

For instance, mixtures of compounds of metals of the sixth group of the periodic table with that of compounds of metals of the eighth group constitute very satisfactory catalysts. Examples are cobalt-molybdenum on alumina and chrome on alumina-silica. These catalysts are advantageously deposited on or otherwise composited with the porous carrier such as activated alumina-silica gel or the various synthetic or natural silica-alumina type cracking catalysts or other materials having a large surface area such as activated carbon. The composite catalyst and carrier is prepared in known manner such as by impregnating the carrier particles with the solution of a compound or salt of the desired composition followed by calcining and reduction (if a reduced catalyst is to be used) or by the coprecipitation to form a gel by mixing metal sulfates and/or nitrates with alkaline silicates. The size of the catalyst, of course, can vary considerably from a microspherical powder up to ¼″ pellets or larger.

The hydrogenation step is carried out in accordance with the invention at temperatures of 650° to 1000° F., preferably at temperatures within the range of 750° to 950° F., depending upon the extent of hydrogenation of the stock desired. For example, if it is desired to carry out a "hydro-refining" operation the temperature employed is 650° F. to 850° F., preferably 750° F. to 800° F. On the other hand if it is desired to effect "hydrocracking," the higher end of the temperature range is employed, viz. reaction is carried out at about 850° F. to 1,000° F., preferably 900° F. to 985° F.

It is a feature of this invention that, as a result of the treatment with the boron fluoride coordination compound, hydrogenation of the oil may be carried out without excessive catalyst poisoning at relatively low temperatures, as indicated above, and at relatively low pressures. Thus, because I make use of nascent hydrogen generated in situ instead of molecular hydrogen the total pressure during the hydrogenation step is suitably maintained within the range of atmospheric pressure to 700 p. s. i. g. and preferably pressures of 150 to 650 p. s. i. g. are employed.

The hydrogen donor may be any hydro-aromatic compound which will dehydrogenate to yield nascent hydrogen under the influence of catalyst at the reaction conditions specified and preferably it is a compound which is liquid at atmospheric conditions. Advantageously, the lower-boiling hydro-aromatic hydrocarbon compounds, such as cyclohexane, methyl-cyclohexane, and tetralin are employed. Hydroxy-substituted dicyclic hydroaromatic compounds, such as ortho- and paracyclohexylphenol, 1,2,3,4-tetrahydro hydroxy naphthalene, and saturated heterocyclic compounds such as pyrrolidine and piperidine, and the like, may also be used.

The quantity of hydrogen donor is selected to provide the above-specified pressure at reaction temperature and generally it is within the range of 0.5 to 10 parts by volume of donor per part of hydrocarbon oil treated. Preferably, however, the proportion is about 1 part by weight of donor per part of hydrocarbon oil. This will generally provide about five times the hydrogen theoretically required for the hydrogenation reaction.

The particular apparatus used in carrying out the hydrogenation step forms no part of the present invention. The process is conveniently carried out in a moving bed system similar to the conventional fluid catalytic cracking or thermofor catalytic cracking process. The hydrogen donor is advantageously mixed with the hydrocarbon oil before it is charged to the reactor but a separate stream of the hydrogen donor may also be provided if desired. Flow rates are employed to maintain a space velocity of 0.1 to 4, preferably 2 to 3, at temperatures below 850° F., and 0.1 to 1 at temperatures above 850° F. The catalyst recirculation rate is advantageously maintained at 5 to 50 tons, preferably 10 to 30 tons per barrel of oil charge per hour. Catalyst regeneration is carried out continuously, except that, since I use a much smaller catalyst to oil ratio and, therefore, a smaller catalyst recirculation rate, the size of the regenerator is very much smaller as compared to conventional catalytic cracking.

The liquid product recovered from the hydrogenation zone will contain excess hydrogen donor and the aromatic dehydrogenation product of the donor. The hydrogen donor and the aromatic product are distilled off, preferably by fractional distillation. In the case of hydroxy compounds, the aromatic compound may be extracted with an alkali metal hydroxide, such as caustic soda. The hydrogenation products of the undesired constituents such as the hydrogen sulfide, ammonia, and water are readily separated from the liquid product by conventional means. The treated hydrocarbon oil may then be fractionally distilled in conventional manner to provide any desired hydrocarbon fractions. The gasoline fraction of the products produced by my process is saturated in nature and although not as high in octane rating as conventional catalytically cracked gasoline, it can be upgraded by catalytic reforming much more easily than conventional catalytic cracked gasoline which would require presaturation before the reforming step.

The separated aromatic compound is suitably hydrogenated to the corresponding hydro-aromatic compound for reuse in the process, hydrogenation being carried out by any conventional means such as, for example, in the presence of a platinum or rhodium catalyst such as those manufactured by Baker & Co., Inc., of Newark, New Jersey, at atmospheric pressure and at a temperature below 200° F. By limiting the use of molecular hydrogen to the rehydrogenation of aromatic compound, the process of the invention has the advantages of requiring low temperature and low pressure and only a small amount of hydrogen gas. Also the hydrogen gas used in this step need not be pure. Hydrogen-carbon monoxide mixtures and/or hydrogen-carbon dioxide mixtures can be used. Thus the cost of hydrogen supply, which is one of the most costly items in conventional hydrogenation using molecular hydrogen, becomes very small in my process.

In another embodiment of my process, the oil and the hydrogen donor can be mixed with a finely-powdered catalyst in an oil to catalyst ratio of 3 to 10 to 1 or preferably 4:1 or an amount of catalyst equal to 5 to 7 times the amount of coke deposit anticipated and heated in a conventional pipe still to the desired temperature range for an appropriate period of time, say from 5 minutes to 1 hour, preferably 10 to 30 minutes. The mixture is flashed, the flash tower bottoms is filtered and the spent catalyst regenerated by burning off the carbon in a separate step. This is an adaptation of the technique used in the "suspensoid catalytic cracking process."

My process may also be carried out in the fixed bed catalyst chamber arrangement. At least two chambers are used. One undergoes regeneration while the other is on stream. The catalyst is regenerated after it has gained about 15–20% by weight due to carbon deposition. With the space velocity range specified above this usually takes 4–6 hours of on-stream time.

The severe catalyst poisoning encountered in the past in treating heavy hydrocarbon oils containing substantial quantities of metallic compounds is avoided in accordance with this invention. Therefore, the activity or the life of the catalyst is much longer than it would have been without the treatment and the necessity of regeneration and replacement becomes less frequent than in conventional pracitce. The catalyst is generally regenerated after it has gained about 15–20% by weight due to carbon deposition.

While the invention is particularly applicable and is particularly advantageous in the treatment of heavy hydrocarbon oils such as Kuwait crude oil, Wafra crude oil and Boscan crude oil, it may also, of course, be applied to lighter petroleum products and may also be used in the treatment of coal tars, oil shale, shale oil, tar sands, natural asphalt and the like.

The following specific examples will serve to illustrate more fully the operation and advantages of the present invention.

*Example I*

This example shows the treatment of a high sulfur crude from the Wafra neutral zone of the Persian Gulf. This crude had the following characteristics:

Gravity, ° API, @ 60° F _____ 24.3
Sulfur, wt. percent _____ 3.11
Carbon residue (A. S. T. M.–D189), wt. percent___ 7.43
Salt content, lbs./1000 bbls _____ 20.1
Ash content, wt. percent _____ 0.015
Water and sediment, vol. percent _____ 0.25
400° F. flash point naphtha, vol. percent _____ 17.6

100 parts by volume of this crude was treated with 4% by volume of $BF_3$-ethyl ether at room temperature for 30 minutes. The mixture was then centrifuged to separate the purified oil from the coalesced residue and was distilled to 400° F. The distillate was allowed to stratify and the lower boron fluoride ethyl ether stratum was separated for reuse. $BF_3$-ethyl ether was also recovered from the coalesced phase by adding 50 parts by weight of methylcyclohexane and distilling, with recycling of methylcyclohexane, until no further quantities of $BF_3$-ethyl ether were present in the distillate. In all, the total recovery of the original $BF_3$-ethyl ether used amounted to 98%. The portion of the thus-treated oil boiling above 400° F. is comparable to a vacuum gas oil from the same crude oil as shown in the following comparative tabulation:

| | Treated Oil | 400–1,100°F. Vacuum Gas Oil |
|---|---|---|
| Gravity, °API, @ 60° F | 31.3 | 24.8 |
| Sulfur, wt. percent | 2.59 | 2.66 |
| Carbon residue (A. S. T. M–D189), wt. percent | 6.40 | 0.81 |
| NiO, p. p. m | 0.15 | 0.33 |
| $V_2O_5$, p. p. m | 3.5 | 0.55 |
| Fe, p. p. m | 1 | 0.53 |
| Volume percent yield from crude oil | 75 | 59.5 |

The concentration of metallic constituents in the treated oil is very low, compared with the quantities of these constituents in the crude oil treated. The volume yield is high.

This treated oil was mixed with an equal quantity by weight of methylcyclohexane and reacted at 790° F. with a cobalt-molybdenum on alumina catalyst designated as G–35 catalyst and supplied by the Girdler Corporation, using a space velocity of 2 weight of oil mixture, including donor, per weight of catalyst per hour at a pressure of 640 lbs. p. s. i. g. The liquid yield is 91% by volume. The oil has a gravity of 38° API and a sulfur content of 0.71%.

*Example II*

Another portion of the same 1:1 weight mixture of methylcyclohexane and treated and topped Wafra crude oil produced in the manner described in Example I was reacted at 932° F. and at atmospheric pressure with a TGR catalyst supplied by the Socony Mobil Oil Company at a space velocity of 1.5. The conversion (i. e. weight percent yield of products boiling below charging stock) was 51%. The percent sulfur reduction was 41%. The liquid yield was 80%.

*Example III*

This example shows the treatment of a 31.4° API Kuwait crude oil having a high sulfur content.

Two parts by volume of boron fluoride ethyl ether were added to 100 parts by volume of this crude and the mixture was agitated at room temperature for 20 minutes. The mixture was then centrifuged to separate the coalesced phase from the refined phase. The boron fluoride ethyl ether was recovered in the manner described in Example I. A comparison between the original and treated crude is as follows:

| | Original Crude | Treated Crude |
|---|---|---|
| Volume Yield, percent | 100 | 93 |
| Gravity, °API, @ 60° F | 31.4 | 32 |
| Carbon residue (A. S. T. M.–D189), wt. percent | 5.0 | 3.55 |
| Sulfur, wt. percent | 2.65 | 2.27 |
| Nickel, p. p. m | 8 | 4.3 |
| Vanadium Oxide, p. p. m | 22 | 10 |

The refined phase was then "topped" to 527° F. The boron trifluoride was recovered in the manner described in Example I. The treated and topped crude had the following composition:

Treated oil
Gravity, ° API @ 60° F _____ 22.3
Sulfur, wt. percent _____ 3.60
Carbon residue (A. S. T. M.–D189), wt. percent__ 6.92

100 parts of the above described treated and topped oil were mixed with 150 parts by weight of tetralin and 10 parts by weight of a finely powdered cobalt-molybdenum on alumina catalyst, and the mixture was heated to 752° F. at 450 p. s. i. g. pressure for 2 hours. The product from this reaction was centrifuged to remove suspended catalyst and then distilled to remove unreacted tetralin and naphthalene produced in the reaction. The product amounted to 90% by volume, based on the oil charged, and it had an API gravity of 23.4°, a sulfur content of 1.46% by weight and a carbon residue of 5.70% by weight. The content of oxygen and nitrogen compounds was negligible.

*Example IV*

This example shows the treatment of another portion of the Kuwait crude oil described in Example III.

Two parts by volume of boron fluoride ethyl ether were added to 100 parts by volume of this crude and the mixture was agitated at room temperature for 20 minutes. The mixture was then centrifuged to separate the coalesced phase from the refined phase. The boron trifluoride ethyl ether was recovered from the coalesced phase in the manner described in Example I.

Without topping, 100 parts of the above-described treated oil were mixed with equal parts by weight of orthocyclohexyl phenol and 10 parts by weight of a finely powdered cobalt-molybdenum on alumina catalyst, and the mixture was heated to 800° F. at 625 p. s. i. g. pressure for 2 hours. The product from this reaction was cooled and centrifuged to remove suspended catalyst and then extracted with dilute (5%) caustic soda to remove unreacted orthocyclohexyl phenol and hydroxy naphthalene produced in the reaction. The product amounted to 87% by volume, based on the oil charged, and it had an API gravity of 34.4°, a sulfur content of 1.56% by weight and a carbon residue of 2.98% by weight. The content of oxygen and nitrogen compounds was negligible.

Thus, in accordance with my process it is possible to reduce the content of undesired constituents materially, the reduction of sulfur compounds, for example, being 50% or more. While my process is applicable to heavy hydrocarbon oils containing various quantities of such undesired constituents, particularly sulfur compounds, it is more particularly applicable to such oils containing at least 2% by weight of sulfur compounds, calculated as S, such compounds being generally of the cyclic type such as thiophene, methyl thiophene and the like.

It will be obvious to those skilled in the art that various changes and modifications may be made in the process hereinabove described without departing from the scope of the invention as defined in the appended claims and it is intended, therefore, that all matter contained in the foregoing description shall be interpreted as illustrative only and not in a limiting sense.

This application is a continuation-in-part of my co-pending application, Serial No. 260,313, filed December 6, 1951.

What I claim and desire to secure by Letters Patent is:

1. A process of treating crude oil, residua and like heavy hydrocarbon oil stocks characterized by a significant content of sulfur compounds to reduce the quantity of said sulfur compounds in said stocks which comprises, intimately mixing the heavy hydrocarbon oil stock at substantially atmospheric pressure with a coalescing agent comprising a coordination compound of boron fluoride, said coalescing agent being employed in a quantity of at least about 0.1% by volume but substantially less than the quantity required for solvent separation of said sulfur compounds from said heavy hydrocarbon oil stock, causing the intimately mixed stock to separate into a coalesced phase and a purified phase, separating said purified phase from said coalesced phase, mixing said purified phase with a hydro-aromatic compound and introducing the mixture into a hydrogenation zone maintained at a pressure ranging from atmospheric pressure to 700 p. s. i. g. in the presence of a hydrogenation-dehydrogenation catalyst, maintaining a temperature of 650 to 1,000° F. in said hydrogenation zone to effect hydrogenation of said purified phase, withdrawing the hydrogenated purified phase from said hydrogenation zone in admixture with the dehydrogenation product of the hydro-aromatic compound, and separating said dehydrogenation product from the hydrogenated purified phase.

2. A process of treating crude oil, residua and like heavy hydrocarbon oil stocks characterized by a significant content of sulfur compounds to reduce the quantity of said sulfur compounds in said stocks which comprises, intimately mixing the heavy hydrocarbon oil stock at substantially atmospheric pressure with a coalescing agent comprising a coordination compound of boron fluoride, said coalescing agent being employed in a quantity of at least about 0.1% by volume but substantially less than the quantity required for solvent separation of said sulfur compounds from said heavy hydrocarbon oil stock, causing the intimately mixed stock to separate into a coalesced phase and a purified phase, separating said purified phase from said coalesced phase, mixing said purified phase with a hydro-aromatic compound and introducing the mixture into a hydrogenation zone maintained at a pressure ranging from atmospheric pressure to 700 p. s. i. g. in the presence of a hydrogenation-dehydrogenation catalyst selected from the group consisting of the metals of the sixth and eighth group of the periodic table and their oxides and sulfides, maintaining a temperature of 650 to 1,000° F. in said hydrogenation zone to effect hydrogenation of said purified phase, withdrawing the hydrogenated purified phase from said hydrogenation zone in admixture with the dehydrogenation product of the hydro-aromatic compound, and separating said dehydrogenation product from the hydrogenated purified phase.

3. A process of treating crude oil, residua and like heavy hydrocarbon oil stocks characterized by a significant content of sulfur compounds to reduce the quantity of said sulfur compounds in said stocks which comprises, intimately mixing the heavy hydrocarbon oil stock at substantially atmospheric pressure with a coalescing agent comprising a coordination compound of boron fluoride, said coalescing agent being employed in a quantity of at least about 0.1% by volume but substantially less than the quantity required for solvent separation of said sulfur compounds from said heavy hydrocarbon oil stock, causing the intimately mixed stock to separate into a coalesced phase and a purified phase, separating said purified phase from said coalesced phase, mixing said purified phase with a hydro-aromatic compound and introducing the mixture into a hydrogenation zone maintained at a pressure ranging from 150 to 650 p. s. i. g. in the presence of a hydrogenation-dehydrogenation catalyst, maintaining a temperature of 650 to 1,000° F. in said hydrogenation zone to effect hydrogenation of said purified phase, withdrawing the hydrogenated purified phase from said hydrogenation zone in admixture with the dehydrogenation product of the hydro-aromatic compound, and separating said dehydrogenation product from the hydrogenated purified phase.

4. A process of treating crude oil, residua and like heavy hydrocarbon oil stocks characterized by a significant content of sulfur compounds to reduce the quantity of said sulfur compounds in said stocks which comprises, intimately mixing the heavy hydrocarbon oil stock at substantially atmospheric pressure with a coalescing agent comprising a coordination compound of boron fluoride in the substantial absence of free boron fluoride and free coordination component, said coalescing agent being employed in a quantity of about 0.1% to 25% by volume of heavy hydrocarbon oil stock, causing the intimately mixed stock to separate into a coalesced phase and a purified phase, separating said purified phase from said coalesced phase, mixing said purified phase with a hydroaromatic compound and introducing the mixture into a hydrogenation zone maintained at a pressure ranging from atmospheric pressure to 700 p. s. i. g. in the presence of a hydrogenation-dehydrogenation catalyst, maintaining a temperature of 650 to 1,000° F. in said hydrogenation zone to effect hydrogenation of said purified phase, withdrawing the hydrogenated purified phase from said hydrogenation zone in admixture with the dehydrogenation product of the hydro-aromatic compound, and separating said dehydrogenation product from the hydrogenated purified phase.

5. A process of treating crude oil, residua and like heavy hydrocarbon oil stocks characterized by a significant content of sulfur compounds to reduce the quantity of said sulfur compounds in said stocks which comprises, intimately mixing the heavy hydrocarbon oil stock at substantially atmospheric pressure at a temperature between about 15° C. and 60° C. with a coalescing agent comprising a coordination compound of boron fluoride, said coalescing agent being employed in a quantity of at least about 0.1% by volume but substantially less than the quantity required for solvent separation of said sulfur compounds from said heavy hydrocarbon oil stock, causing the intimately mixed stock to separate into a coalesced phase and a purified phase, separating said purified phase from said coalesced phase, mixing said purified phase with a hydro-aromatic compound and introducing the mixture into a hydrogenation zone maintained at a pressure ranging from atmospheric pressure to 700 p. s. i. g. in the presence of a hydrogenation-dehydrogenation catalyst, maintaining a temperature of 650 to 1,000° F. in said hydrogenation zone to effect hydrogenation of said purified phase, withdrawing the hydrogenated purified phase from said hydrogenation zone in admixture with the dehydrogenation product of the hydro-aromatic compound, and separating said dehydrogenation product from the hydrogenated purified phase.

6. A process of treating crude oil, residua and like heavy hydrocarbon oil stocks characterized by a significant content of sulfur compounds to reduce the quantity of said sulfur compounds in said stocks which comprises, intimately mixing the heavy hydrocarbon oil stock at substantially atmospheric pressure at a temperature between about 15° C. and 60° C. for ½ minute to 30 minutes with a coalescing agent comprising a coordination compound of boron fluoride in the substantial absence of free boron fluoride and free coordination component, said coalescing agent being employed in a quantity of about 0.1% to 25% by volume of said heavy hydrocarbon oil stock, causing the intimately mixed stock to separate into a coalesced phase and a purified phase, separating said purified phase from said coalesced phase, mixing said purified phase with a hydro-aromatic compound and introducing the mixture into a hydrogenation zone maintained at a pressure ranging from atmospheric pressure to 700 p. s. i. g. in the presence of a hydrogenation-dehydrogenation catalyst, maintaining a temperature of 650 to 1,000° F. in said hydrogenation zone to effect hydrogenation of said purified phase, withdrawing the hydrogenated purified phase from said hydrogenation zone in admixture with the dehydrogenation product of the hydro-aromatic compound, and separating said dehydrogenation product from the hydrogenated purified phase.

7. A process of treating crude oil, residua and like heavy hydrocarbon oil stocks characterized by a significant content of sulfur compounds to reduce the quantity of said sulfur compounds in said stocks which comprises, intimately mixing the heavy hydrocarbon oil stock at substantially atmospheric pressure at a temperature between about 15° C. and 60° C. for ½ minute to 30 minutes with a coalescing agent comprising a coordination compound of boron fluoride in the substantial absence of free boron fluoride and free coordination component, said coalescing agent being employed in a quantity of about 0.1% to 25% by volume of said heavy hydrocarbon oil stock, causing the intimately mixed stock to separate into a coalesced phase and a purified phase, separating said purified phase from said coalesced phase, mixing said purified phase with a hydro-aromatic compound and introducing the mixture into a hydrogenation zone maintained at a pressure ranging from atmospheric pressure to 700 p. s. i. g. in the presence of a hydrogenation-dehydrogenation catalyst selected from the group consisting of the metals of the sixth and eighth groups of the periodic table and their oxides and sulfides, maintaining a temperature of 650 to 1,000° F. in said hydrogenation zone to effect hydrogenation of said purified phase, withdrawing the hydrogenated purified phase from said hydrogenation zone in admixture with the dehydrogenation product of the hydro-aromatic compound, and separating said dehydrogenation product from the hydrogenated purified phase.

8. A process of treating crude oil, residua and like heavy hydrocarbon oil stocks characterized by a significant content of sulfur compounds to reduce the quantity of said sulfur compounds in said stocks which comprises, intimately mixing the heavy hydrocarbon oil stock at substantially atmospheric pressure at a temperature between about 15° C. and 60° C. for ½ minute to 30 minutes with a coalescing agent comprising a coordination compound of boron fluoride in the substantial absence of free boron fluoride and free coordination component, said coalescing agent being employed in a quantity of about 0.1% to 25% by volume of said heavy hydrocarbon oil stock, causing the intimately mixed stock to separate into a coalesced phase and a purified phase, separating said purified phase from said coalesced phase, mixing said purified phase with a hydro-aromatic compound and introducing the mixture into a hydrogenation zone maintained at a pressure ranging from 150 to 650 p. s. i. g. in the presence of a hydrogenation-dehydrogenation catalyst selected from the group consisting of the metals of the sixth and eighth groups of the periodic table and their oxides and sulfides, maintaining a temperature of 650 to 1,000° F. in said hydrogenation zone to effect hydrogenation of said purified phase, withdrawing the hydrogenated purified phase from said hydrogenation zone in admixture with the dehydrogenation product of the hydro-aromatic compound, separating said dehydrogenation product from the hydrogenated purified phase, hydrogenating said hydrogenation product to the original hydro-aromatic compound and recycling said hydro-aromatic compound to the hydrogenation zone with additional quantities of said purified oil.

References Cited in the file of this patent

UNITED STATES PATENTS

| | | |
|---|---|---|
| 2,253,308 | Rosen | Aug. 19, 1941 |
| 2,495,851 | Lien et al. | Jan. 31, 1950 |
| 2,657,175 | Mason | Oct. 27, 1953 |